United States Patent

[11] 3,609,562

[72] Inventors Peter J. Granata
Campbell;
Francis E. Mueller, San Jose, both of Calif.
[21] Appl. No. 55,792
[22] Filed July 17, 1970
[45] Patented Sept. 28, 1971
[73] Assignee International Business Machines Corporation
Armonk, N.Y.

[54] SYNCHRONIZED DEMODULATOR
10 Claims, 5 Drawing Figs.

[52] U.S. Cl. .......... 329/50, 328/133, 340/174.1 H
[51] Int. Cl. .......... H03d 3/18
[50] Field of Search .......... 340/174.1 B, 174.1 H, 174.1 L; 329/50; 328/133, 155, 163

[56] References Cited
UNITED STATES PATENTS

| | | | |
|---|---|---|---|
| 2,864,077 | 12/1958 | De Turk | 340/340.1 H |
| 3,408,581 | 10/1968 | Wakamoto et al. | 328/133 X |
| 3,524,994 | 8/1970 | Ritter | 328/163 X |

*Primary Examiner*—Alfred L. Brody
*Attorneys*—Hanifin and Jancin and Edward M. Suden

ABSTRACT: This invention relates to a demodulator used in a servo-positioning system which is maintained in synchronization both during the track-seeking mode and the fine-positioning mode of operation of the servosystem. The demodulator monitors signals received from the servoed medium and obtains from this signal, positioning information between the servoed means and the servoing apparatus, while obtaining synchronization information from the same received signals. The demodulator is comprised of a positive level detector, a negative level detector, a synchronizable free-running multivibrator, delayed single shots, gates, a positive peak detector and a negative peak detector. A means for including a noise rejection means into the demodulator is also shown.

INVENTORS
PETER J. GRANATA
FRANCIS E. MUELLER

BY Edward M. Suden
AGENT

SYNCHRONIZED DEMODULATOR

CROSS-REFERENCES TO RELATED APPLICATIONS

U.S. Pat. application, Ser. No. 692,439, entitled "Method and Apparatus for Recording and Detecting Information" inventor George R. Santana, filed Dec. 21, 1967, assigned to the same assignee.

BACKGROUND OF THE INVENTION

1. Field of the Invention

The invention relates to subject matter including a locally generated source of controlled oscillations or pulses, which are at substantially the same frequency repetition rate as the incoming signals or harmonically related to the incoming signals, to render the detector alternately responsive and nonresponsive, or at least materially less responsive to the incoming signals. More specifically, the invention relates to a demodulator which is synchronized to the incoming signal for the purpose of detecting part of the incoming signals.

2. Prior Art

This invention is directed towards a demodulator to be used in a servosystem in the environment of a random access magnetic disk memory system. In the random access disk memory system, the servosystem is used for two principal purposes; first, to move the read/write head from one track address to another track address and, secondly, to fine position that read/write head with reference to the center of the desired track address to obtain a high degree of confidence that the information recorded within that track address will be read or written by the positioned read/write head without interference to and from an adjacent track.

Many techniques are known in the prior art for positioning the read/write head at a given track address such as by counting the number of track crossings. Another approach is generating an analog voltage that is a function of the position of the read/write head with respect to the magnetic disk. The operation of positioning the read/write head or heads to a given track on a magnetic disk is called the track-addressing mode of operation.

Many different systems have been devised for positioning the read/write head on the center of a given track address, once the read/write head has been put into the general vicinity of the desired track address. Generally, a signal is generated whose sign is indicative of whether the read/write head is either to the right or to the left of the center of whose magnitude is indicative of the degree of offset from the center of the desired track address of the read/write head.

To produce more efficient utilization of the available data surface, it is advantageous to have a fine-positioning means, that includes a demodulator, which is synchronized to the servo information on the servo tracks of the random access disk memory as fast as possible. In the past, the demodulator or clock being used to demodulate the servo information in the servo system for fine-positioning error generation occurred after the system was placed in a fine-positioning mode of operation from the track address mode of operation.

It is therefore an object of the present invention to provide synchronization of a demodulator during the track-addressing mode of operation and during the fine-positioning mode of operation.

It is another object of the invention to maintain synchronization of the demodulator regardless of the position of the read/write head with reference to the magnetic disk.

It is another object of this invention to provide a noise reject means in the demodulator to improve accuracy of the demodulator.

SUMMARY OF THE INVENTION

This invention relates to a synchronized demodulator specifically to be used in the environment of a random access magnetic disk storage system having a servosystem as described in U. S. Pat. application, Ser. No. 692,439, entitled "Method and Apparatus for Recording and Detecting Information," inventor George R. Santana, filed Dec. 21, 1967 and assigned to IBM.

The servo signals generated in the transducer from the magnetic media are monitored by the synchronizable demodulator. The signals received by the demodulator are transformed into two pulse trains by the positive and negative level detectors. The amplitude of the pulses and the two pulse trains is independent of the amplitude of the servo signals being received by the demodulator. The synchronized, free-running multivibrator has a nominal frequency lower than the nominal servo signal frequency and is synchronized by portions of the two pulse trains from the positive and negative level detectors respectively. The output of the multivibrator is fed to delay single shots which transform the output of the multivibrator into two gating pulse trains. The output of the delayed single shots conditions gating means for sampling portions of the incoming servo signal by means of the gating pulse trains. The outputs from the delayed single shots also may be used to gate the output of the positive and negative level detectors to the multivibrator, and by so doing, performs a noise rejection function which will improve the accuracy of the demodulator. The output of the gating means is fed to a positive peak detector and a negative peak detector respectively, which generate error signals indicative of the position of the read/write head with reference to the center of a given track address.

The condition of the output of either the positive peak detector or negative peak detector being equal to zero is a crossover indication indicative of the fact that the read/write head is positioned equally on two adjacent data tracks and centered on a servo track. It is well known in the art that by counting these crossover indications, the magnetic tracks on the magnetic disk may be addressed by the read/write head. Even when the system is in a track-addressing mode of operation, the synchronized, free-running multivibrator will be synchronized by portions of the pulse trains generated by the positive level detector and the negative level detector, respectively.

The foregoing and other objects, features and advantages of the invention will be apparent from the following, more particular description of the preferred embodiment of the invention as illustrated in the accompanying drawings.

DETAILED DESCRIPTION OF THE PREFERRED EMBODIMENT

Figure 1:
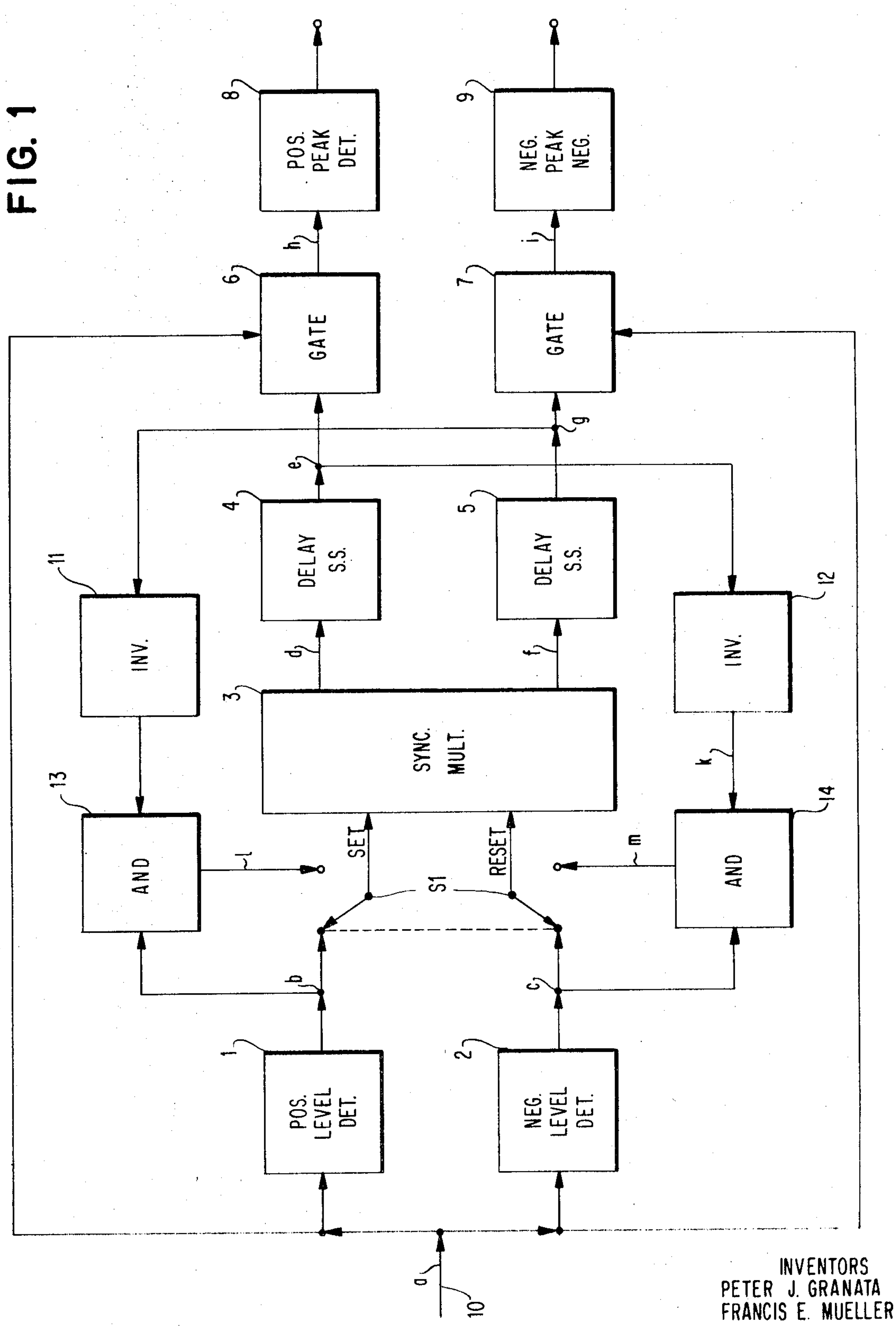
FIG. 1 shows the preferred embodiment of the synchronized demodulator.

FIG. 1 shows the preferred embodiment of the synchronized demodulator of the invention. Switch S1 is in the position removing the noise rejection means from the demodulator.

The servo signal read by the read/write head is fed into the synchronized demodulator by input line 10, which is connected as the input to the positive level detector 1 and the negative level detector 2. The positive level detector 1 generates a positive pulse of a given pulse width and amplitude every time the input exceeds the threshold value in the servo signal inputted on line 10. The negative level detector 2 in like manner generates a pulse of a given width and magnitude whenever the servo signal inputted on line 10 exceeds its threshold level in the negative direction. The output of the positive level detector 1 is the set input to a synchronized, free-running multivibrator 3. The output of the negative level detector 2 is the reset input to the multivibrator 3. The multivibrator 3 has a nominal frequency that is slightly below the nominal servo signal frequency and will set and reset at the frequency dictated either by the input signals occurring on the set or reset lines, or to the nominal frequency, whichever occurs first. A first output of the multivibrator 3 is connected as an input to the delayed single shot 4. A second output of the multivibrator 3 is connected as an input to the delayed single shot 5. The first output of the multivibrator 3 is the complement of the second output. The delayed single shots 4 and 5 operate such that they will initiate a pulse a given time after the occurrence of a reversal of the multivibrator output and will terminate the pulse when the multivibrator output returns to its original state. The output of delayed single shot 4 acts as a gating signal for gate 6 and the output of delayed single shot 5 acts as a gating signal for gate 7. The input servo signal is fed to gates 6 and 7. Gate 6 is conditioned by delayed single shot 4 for a period of time to sample the input servo signal on line 10 to obtain information as to the relative position of the read/write head with respect to the center of a track address in a first direction by sampling and holding the peak value of the input servo signal passing through gate 6 by means of the positive peak detector 8. In similar manner, the output of delayed single shot 5 generates a gating signal for gate 7 such that the input servo signal on line 10 is sampled during a period of time associated with information as to the position of the read/write head with respect to the center of a given track address in the opposite direction than sampled by gate 6. The peak value of the servo signal sampled by gate 7 is stored by the negative peak detector 9. The output of the positive peak detector 8 and the negative peak detector 9 gives the relative displacement of the read/write head in the two directions from the center of a given track address. This information is used to generate an error signal which is fed into the servosystem for positioning the servo head so that it will be at the center of the desired track address.

Switch S1, when placed in the position such that AND 13 and 14 and inverters 11 and 12 are incorporated into the demodulator, provides the system with a noise-rejection means. The output of delayed single shot 4 is connected to inverter 12. The output of inverter 12 is one of the inputs of AND 14 and acts as a noise-rejection signal for spurious signals on the output of the negative level detector 2, which is the second input to AND 14. The output of AND 14 is connected to multivibrator 3 via switch S1. Similarly, inverters 11 and 13 are connected into the demodulator to provide noise rejection in the output of the positive level detector 1.

All the circuit elements, that is, positive level detector 1, the negative level detector 2, the synchronized, free-running multivibrator 3, the delayed single shots 4 and 5, the coincidence gates 6 and 7, AND 13 and 14, inverters 11 and 12, the positive peak detector 8 and the negative peak detector 9 are all circuits well known in the art, and do not constitute part of this invention.

OPERATION OF THE PREFERRED EMBODIMENT

The operation of the preferred embodiment will be explained by means of three examples, by which the entire operation of the synchronized demodulator is covered.

EXAMPLE 1

Figure 2A:
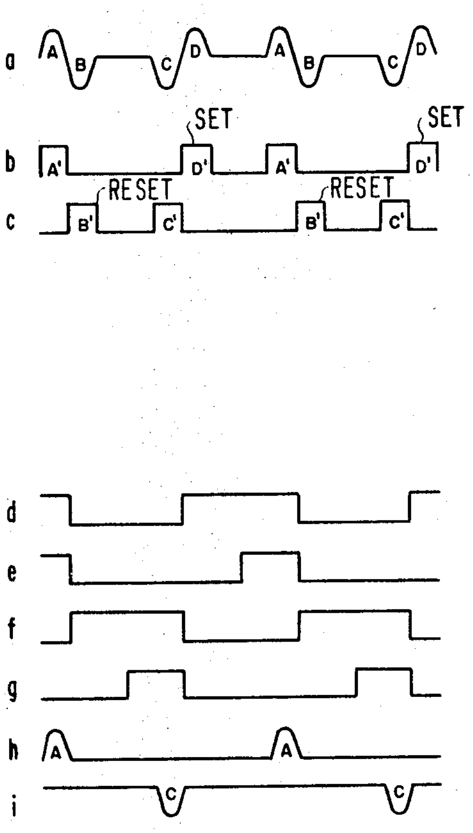
FIG. 2A shows a series of waveforms associated with the synchronized demodulator without the noise rejection means when the read/write head is centered on a required track address.

With reference to FIG. 2A, a series of waveforms are shown with respect to the operation of the synchronized demodulator without noise rejection, as shown in FIG. 1 for the condition that the read/write head is centered on a track address. Under these conditions, waveform *a* will be generated as the servo signal on line 10. The center of a track address is determined by having two concentric tracks on the servo disk so arranged that their boundary occurs at the center of a data track address on the data disk. This is made clear in the copending application heretofore referenced. The given servo pattern of that reference will generate the signal shown in waveform *a*, where the components of the servo signals A and B are generated from one servo track and the components C and D of the input servo signal are generated from components of the second servo track. As previously stated, when the read/write head is centered about a given track address, the servo head in the servo disk will be reading signals equally from each of the two servo tracks; and, therefore, the amplitude of the component from these two tracks will be equal.

Waveform *b* of FIG. 2 shows the pulse train generated by the positive level detector 1 and waveform *c* of FIG. 2 shows the pulse train generated by negative level detector 2. Pulses of the pulse train generated by the positive level detector 1 are designated A′ and D′ to relate back to that portion of the input servo signal which initiated the generation of those pulses. In similar manner, pulses B′ and C′ of waveform *c* are so designated to show what corresponding part of input servo signal, as shown in waveform *a*, initiated the generation of the pulses. Under the given condition, pulses D′ of waveform *b* will set multivibrator 3 and pulses B′ of waveform *c* will reset multivibrator 3; therefore, the frequency of pulses D′ and B′ dictate the frequency at which the multivibrator will operate. It should further be noted, that under these conditions, the multivibrator 3 is synced twice during each cycle of the multivibrator. Waveform *d* shows the first output of the multivibrator 3 which is inputted to delayed single shot 4. Waveform *e* shows the resulting pulse train generated by the delayed single shot 4. As previously stated, the delayed single shot will fire a fixed period of time after the occurrence of a positive transition on its input line and will terminate the pulse of the occurrence of a negative transition on its input line. Waveform *e* becomes the gating signals for gate 6.

In similar manner, waveform *f* (the complement output of waveform *d*) is fed as input to delayed single shot 5 for generating the gating signals is shown as waveform *g*. The output of gate 6 is waveform *h* and the output of gate 7 is waveform *i*. It should be noted that waveform *h* consists only of A portions of the input waveform *a* and waveform *i* consists only of C portions of the input servo signal shown in waveform *a*. The positive peak detector 8 stores the peak values of the A pulses and negative peak detector 9 stores the negative peak of C pulses. The output of the positive peak detector 8 and the negative peak detector 9 can be used to determine the relative position of the read/write head with respect to the center of the desired track address.

Figure 2B:
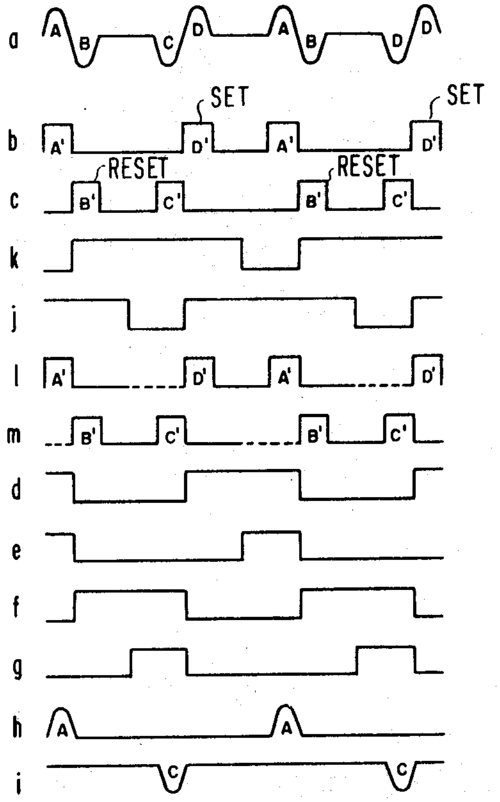
FIG. 2B shows a series of waveforms associated with the synchronized demodulator with the noise rejection means when the read/write head is centered on a required track address.

When the noise rejection means is introduced into the demodulator by switch S1, the demodulator operation remains substantially the same. FIG. 2B shows the waveforms associated with the operation of the demodulator with noise rejection.

The main difference in the operation of the demodulator is that the output of the positive level detector 1 and negative level detector 2 is gated by AND's 13 and 14 respectively, which are conditioned for some period less than the period of the incoming signal. Waveforms 1 and *m* are the same as waveforms *b* and *c*, respectively. However, the time represented by the broken line in waveforms 1 and *m* connote the amount of time during which positive pulses cannot exist to effect multivibrator 3. Since correct positive pulses should not appear during this time, any positive pulse that does appear must be erroneous and should be, and will be, ignored.

EXAMPLE 2

Figure 3:
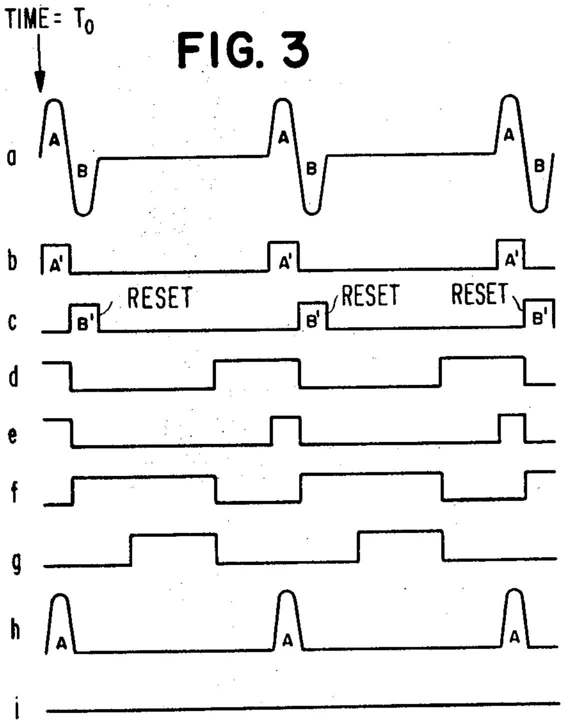
FIG. 3 is a series of waveforms for the synchronized demodulator when the read/write head is displaced one-half track width from the center of the desired track address. FIG.

With reference to FIG. 3, the waveform shown in FIG. 3 will occur when the read/write head is one-half track position off in one direction from the center of the desired track address; in which case, the servo read/write head will be centered on a servo track; and, therefore, only components from one track will exist under this condition. This is shown by waveform *l*, in that, there are no components C and D. Once again, waveform *b* shows the pulse trains generated by the positive level detector 1, and waveform *c* shows the pulse train generated by the negative level detector 2. Waveform *d* shows the first output of the multivibrator 3. It should be noted that component B′ of waveform *c* still resets the multivibrator 3 such that the period of the multivibrator 3 remains the same as the period of the multivibrator 3 in example 1. However, it should be noted that the transition from the first state to the second state of the multivibrator 3 is now dictated by the nominal frequency of the multivibrator 3 itself. The outputs of the multivibrator 3 are still used to generate the gating signals shown in waveform *e* and *g*, respectively. The gating signals of waveform *e* still gate the A portions of the input servo signal shown as waveform *a*. Since there is no component C and D in the input servo signal as shown in waveform *a*, there is no output on line *i*, even though there is a gating signal generated for gate 8.

It should be noted that this is one of the two worst case conditions, and that the synced free-running multivibrator is still maintained at the same frequency as under the ideal case which was shown in example 1 .

EXAMPLE 3

Figure 4:
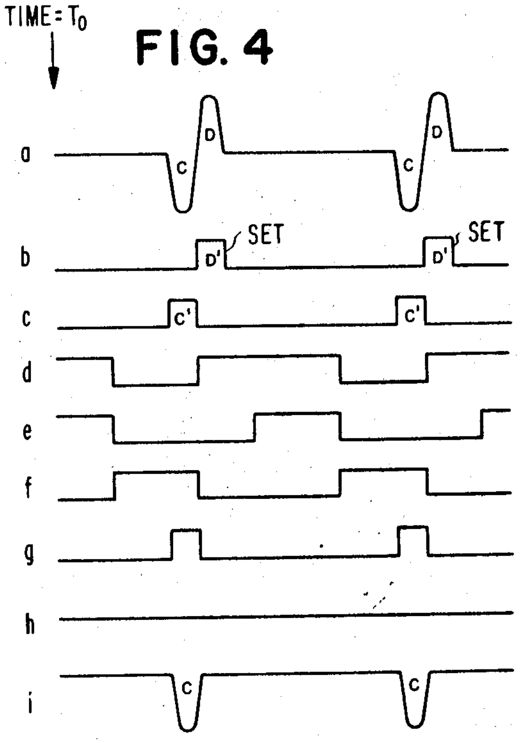
FIGURE 4 is a series of waveforms associated with the synchronized demodulator under the condition that the read/write head is displaced one-half track width in the opposite direction than the read/write head as shown in FIG. 3 from the center of the same track address.

With reference to FIG. 4, FIG. 4 shows the waveforms associated with the synchronized demodulator when the input servo signal is associated with the second worst case. The second worst case is where the read/write head is positioned in the opposite direction one-half track from the center of the desired track address, such that it is centered over a servo track so that only components C and D will appear in waveform *a*. As shown in waveform *b*, the pulses from the positive level detector 1 are D′ pulses which sets multivibrator 3; and once again, as can be seen by waveform *b*, the period between adjacent set pulses is such as to maintain multivibrator 3 at the same frequency as in example 2 and example 1. As shown in example 2, gating signals are developed for gates 6 and 7 such that the input servo waveform shown as waveform *a* will be sampled to generate waveform *h* and *i*, which indicate the relative position of the read/write head with reference to the center of the desire track address.

SUMMARY

As can be seen from the three preceding examples, the synchronized free-running multivibrator 3 will be maintained at a fixed frequency dictated by the incoming servo signal inputted on line 10 of the synchronized demodulator regardless of the position of the read/write head with reference to a given track address.

Therefore, when the system is in a track-addressing mode and counting the number of track crossings to place the read/write head on the desired track address, the demodulator remains in synchronization since the synchronized, free-running multivibrator will remain in sync for all conditions; and once the system shifts from the track-addressing mode to a fine-positioning mode, fine positioning may start immediately and no erroneous information will be obtained due to the demodulator not being synchronized with the incoming servo signal.

While the invention has been particularly shown and described with reference to a preferred embodiment thereof, it will be understood by those skilled in the art, that various changes in the arrangement of circuitry and in form and details may be made therein, without departing from the spirit and scope of the invention.

What is claimed is:

1. A demodulator, for extracting a first information component of frequency F and a second information component of frequency F from the input signal to said demodulator, comprising:

a first means for generating a first pulse for each positive pulse sensed in said input signal and for generating a second pulse for each negative pulse sensed in said input signal;

a synchronizable free-running multivibrator having a nominal frequency less than said frequency F, said synchronizable free-running multivibrator being synchronized to said frequency F by said first and said second pulses received from said first means;

a second means for generating a first gating signal and a second gating signal from the output received from said multivibrator; and a third means for extracting from said input signal said first information component under control of said first gating signal and for extracting from said input signal said second information component under control from said second gating signal.

2. A demodulator as set forth in claim 1 further comprising:

a fourth means for detecting and holding the peak value of said first information component received from said third means and for detecting and holding the peak value of said second information component received from said third means.

3. A demodulator as set forth in claim 2 further comprising:

a fifth means for gating said first and second pulses to said synchronizable free-running multivibrator as a function of a noise-rejection signal generated from said first and second gating signals.

4. The demodulator as set forth in claim 1 wherein said first means comprises:

a positive level detector for generating said first pulses whenever a positive pulse is sensed in said input signal, said first pulses being of a fixed amplitude and pulse width; and a negative level detector for generating said second pulses whenever a negative pulse is sensed in said input signal, said second pulse being of a fixed amplitude and pulse width.

5. A demodulator as set forth in claim 1 wherein said second means comprises:

a first delay single shot connected to said output of said multivibrator for generating a first gating signal, said first delay single being activated by a first type of transition in said output of said multivibrator and reset by the opposite type of transition from said first type of transition in said output of said multivibrator; and a second delay single shot connected to the complement of said output of said multivibrator for generating said second gating signals, said second delayed single shot being activated by a first type of transition in said complement output of said multivibrator and reset by the opposite type of transition from said first type of transition in said complement output of said multivibrator.

6. A demodulator as set forth in claim 5 wherein said third means comprises:

a first gate conditioned by said first gating signal to extract from said input signal said first information component; and a second gate conditioned by said second gating signal to extract from said input signal said second information component.

7. The demodulator as set forth in claim 3 wherein said first means comprises:

a positive level detector for generating said first pulses whenever a positive pulse is sensed in said input signal, said first pulses being of a fixed amplitude and pulse width; and a negative level detector for generating said second pulses whenever a negative pulse is sensed in said input signal, said second pulse being of a fixed amplitude and pulse width.

8. A demodulator as set forth in claim 3 wherein said second means comprises:

a first delay single shot connected to said output of said multivibrator for generating a first gating signal, said first delay single shot being activated by a first type of transition in said output of said multivibrator and reset by the opposite type of transition from said first type of transition in said output of said multivibrator; and a second delay single shot connected to the complement of said output of said multivibrator for generating said second gating signals, said second delayed single shot being activated by a first type of transition in said complement output of said multivibrator and reset by the opposite type of transition from said first type of transition in said complement output of said multivibrator.

9. A demodulator as set forth in claim 8 wherein said third means comprises:

a first gate conditioned by said first gating signal to extract from said input signal said first information component; and a second gate conditioned by said second gating signal to extract from said input signal said second information signal.

10. A demodulator as set forth in claim 9 wherein said fourth means comprises:

a positive peak detector for receiving said first information component from said first gate for detecting and holding the peak value of said first information component that is passed through said first gate whenever said first gate is conditioned by said first gating signal; and a negative peak detector for receiving said second information component from said second gate for detecting and holding the peak value of said second information component that is passed through said second gate whenever said second gate is conditioned by said second gating signal.